United States Patent Office 3,488,378
Patented Jan. 6, 1970

3,488,378
COMPLEXES OF ORGANIC SULFOXIDES AND HYDROGEN CHLORIDE AND RELATED SULFONIUM SALTS
Horst G. Langer, Cochituate, and Almut H. Blut, Framingham, Mass., assignors to The Dow Chemical Company, Midland, Mich., a corporation of Delaware
No Drawing. Filed Apr. 6, 1966, Ser. No. 540,515
Int. Cl. C07c 147/08
U.S. Cl. 260—456    5 Claims

ABSTRACT OF THE DISCLOSURE

This invention concerns novel complexes of organic sulfoxides and anhydrous hydrogen chloride having the formula:

$$R_1R_2SO \cdot HCl \quad (I)$$

wherein $R_1$ and $R_2$ individually are $C_1$–$C_{10}$, aliphatic and aromatic hydrocarbon groups, and a process for their preparation. Although these complexes are metastable at room temperature, they can be readily stored at 20°–30° C. in a static system. At temperatures above about 60° C. they undergo thermal disproportionation and rearrangement to a mixture of products including novel sulfonium sulfite salts of the formula:

$$(R)_3S^+ROSO_2^- \quad (II)$$

wherein each R individually is $R_1$ or $R_2$.

BACKGROUND

Organic sulfoxides such as dimethyl sulfoxide, dibenzyl sulfoxide and diphenyl sulfoxide have been widely studied because of many unusual properties including those associated with the basic sulfoxide group. Complexes with a variety of inorganic halides including aluminum chloride, ferric chloride and boron trifluoride have been reported. The specific and molar conductances of several organic sulfoxides in liquid HCl at —95° C. have been reported by Peach and Waddington, J. Chem. Soc., 2680 (1962).

It has now been discovered that organic sulfoxides of the formula:

$$R_1R_2SO \quad (III)$$

wherein $R_1$ and $R_2$ individually are $C_1$–$C_{10}$, aliphatic and aromatic hydrocarbon groups, readily absorb one mole of anhydrous HCl at 0°–30° C. to form complexes of the formula: $R_1R_2SO \cdot HCl$. At room temperature these complexes range from colorless liquids to white solids. They are quite stable in a static system at 0–30° C. under an equilibrium vapor pressure of the complex and its components. The complexed HCl can be removed by prolonged stripping in vacuo.

The organic sulfoxide-hydrogen chloride complexes are readily prepared from di($C_1$–$C_6$ alkyl) sulfoxides such as dimethyl sulfoxide, diethyl sulfoxide, methyl ethyl sulfoxide, di-n-propyl sulfoxide, and dibutyl sulfoxides as well as from di($C_6$–$C_{10}$ aromatic) sulfoxides containing aryl, alkaryl and aralkyl groups such as diphenyl sulfoxide, di-p-tolyl sulfoxide, di-p-isopropylphenyl sulfoxide, di-xylyl sulfoxides, dibenzyl sulfoxide and di-β-phenethyl sulfoxide. Other $C_1$–$C_{10}$ alkyl, aryl, alkaryl and aralkyl sulfoxides including mixed sulfoxides such as benzylmethylsulfoxide can also be used.

To prepare the sulfoxide-hydrogen chloride complexes, anhydrous gaseous HCl is contacted with the organic sulfoxide at 30° C. or below until absorption of HCl ceases with absorption of one mole of HCl per mole of sulfoxide. Cooling is necessary and a large excess of HCl should be avoided to prevent decomposition of the complex after formation. An inert diluent or solvent such as benzene, toluene, n-heptane, carbon tetrachloride or methylene chloride can be used but may complicate recovery and isolation of the complex.

When one mole of HCl has been absorbed by the sulfoxide, there is a noticeable break in the uptake of HCl. Excess HCl is vented. The reactor may be briefly flushed with an inert gas and the complex isolated in a suitable manner. At room temperature the aromatic sulfoxide·HCl complexes are generally liquid while the di($C_1$–$C_6$ alkyl) sulfoxide·HCl salts are normally white solids. Stored in a sealed vial at room temperature the sulfoxide·HCl complexes are quite stable.

At about 60° C. thermal decomposition of the organic sulfoxide·HCl complexes is evident. At 80°–90° C. or higher a rapid exothermic reaction occurs with extensive disproportionation and rearrangement. The complex mixture contains primarily an oily mixture of low molecular weight polymers including polyalkylsulfoxides, polyalkylsulfonic acids and polyalkylsulfides plus a significant amount of a stable solid organosulfonium sulfite of the formula: $(R)_3S^+ROSO_2^-$ (II) wherein each R individually is $R_1$ or $R_2$.

Particularly with the HCl complex of a symmetrical di($C_1$–$C_6$ alkyl) sulfoxide, e.g. $R_1R_2SO \cdot HCl$ wherein $R_1=C_1$–$C_6$ alkyl and $R_2=R_1$, the thermal disproportionation gives moderate yields of the novel sulfonium sulfite which can be separated from the liquid byproducts in high purity. Such sulfonium sulfite salts are useful intermediates for further synthesis. Also they are a convenient source of trialkylsulfonium cations or alkyl sulfite anions.

This thermal decomposition of the organic sulfoxide·HCl salts occurs not only with the preformed complex, but also when the organic sulfoxide is treated with anhydrous HCl at temperatures of 60–150° C. or higher.

The organic sulfoxide·HCl complexes and also the mixed rearrangement products are mildly acidic and provide a convenient means for incorporating normally corrosive HCl into cleaning formulations. Further these complexes can be used as thermally initiated acidic curing agents for resinous adhesives and coatings.

The following examples illustrate further the present invention. Unless otherwise specified all parts and percentages are by weight.

Example 1.—Dimethyl sulfoxide hydrochloride

A slow stream of anhydrous hydrogen chloride was passed into a reactor containing vigorously stirred anhydrous dimethyl sulfoxide while controlling the temperature at 0°–10° C. A white solid precipitate formed as the hydrogen chloride was absorbed. When the mixture appeared completely solid and the rapid uptake of hydrogen chloride ceased, the mixture was filtered in a dry atmosphere to recover the solid product in a yield greater than 80 percent.

The white dimethyl sulfoxide hydrochloride $$(Me_2SO \cdot HCl)$$

was identified by elemental and spectrographic analyses. It dissolved readily in water and other polar solvents to give mildly acidic solutions. When left in contact with excess hydrogen chloride at room temperature, the salt gradually liquified. Heating the isolated hydrochloride complex or a solution or suspension in dimethyl sulfoxide or other suitable inert diluent at 80°–90° C. caused a vigorous exothermic reaction with copious evolution of hydrogen chloride and formation of a viscous liquid mixture. Analysis of such liquid revealed 10–20 percent polyformaldehyde, 25–30 percent polydimethylsulfoxide·HCl, about 30 percent polymethanesulfoinic acid, a small amount of a polysulfide or disulfide, and traces of a high melting white solid. The mixture was moderately soluble in water.

Similar results are obtained with diethyl sulfoxide and other di-($C_1$–$C_6$ alkyl) sulfoxides.

Example 2.—Trimethylsulfonium methylsulfite

Anhydrous HCl was rapidly passed into stirred dimethyl sulfoxide at about 100° C., until the vigorous reaction and absorption of HCl ceased. The mixture was cooled and a white crystalline salt product was recovered in about 30 percent yield. The salt, which had a M.P. of 200° C., was identified by elemental and spectographic analyses as trimethylsulfonium methylsulfite of high purity. The mother liquor contained smaller amounts of soluble polyformaldehyde, polydimethylsulfoxide·HCl and polymethane-sulfonic acid.

Example 3.—Diphenyl sulfoxide·HCl

Anhydrous HCl was slowly introduced at room temperature into an evacuated glass bulb containing diphenyl sulfoxide. As the solid sulfoxide absorbed the HCl it liquified. Addition of HCl was continued until absorption of HCl ceased. Then excess HCl was stripped from the reactor under moderate reduced pressure at room temperature. The residual liquid complex had the following analysis:

Calc. for $C_{12}H_{10}SO \cdot HCl$: C, 60.37; H, 4.64; Cl, 14.85; S, 13.43. Found: C, 66.32; H, 4.25; Cl, 13.85; S, 12.85.

The diphenyl sulfoxide·HCl readily dissolved in water and other polar solvents. On heating, HCl was evolved with formation of a viscous liquid residue.

We claim:
1. A sulfonium sulfite salt of the formula:

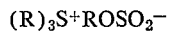

$$(R)_3S^+ROSO_2^-$$

wherein each R is individually alkyl of 1–6 carbon atoms or monocyclic aromatic hydrocarbon of 6–10 carbon atoms.

2. The sulfonium salt of claim 1 wherein each R is alkyl of 1–6 carbon atoms.

3. The sulfonium salt of claim 1 wherein each R is methyl.

4. A process for preparing the sulfonium salt of claim 2 which comprises passing anhydrous HCl into a dry di-($C_1$–$C_6$ alkyl) sulfoxide at 60°–150° C. until absorption of HCl ceases and thereafter recovering the sulfonium salt.

5. The process of claim 4 wherein the sulfoxide is dimethyl sulfoxide.

References Cited

UNITED STATES PATENTS

| | | | |
|---|---|---|---|
| 2,104,794 | 1/1938 | De Groote | 260—607 XR |
| 2,185,654 | 1/1940 | Van Peski et al. | 260—607 |

OTHER REFERENCES

Fromm, C. A., vol. 6, p. 1600[5] (1912).

Hermann, Ber. Deut. Chem., vol. 39, pp. 3812–3816 (1906).

Vorlander, Ber. Deut. Chem., vol. 64, pp. 1736–1739 (1931).

Crown Zellerbach Corporation Technical Bulletin, "Dimethyl Sulfoxide," p. 16, (May 1964).

FLOYD D. HIGEL, Primary Examiner

U.S. Cl. X.R.

106—287; 252—121, 169; 260—2, 29.1, 513, 607, 609